United States Patent [19]
Brueckheimer et al.

[11] Patent Number: 5,917,824
[45] Date of Patent: Jun. 29, 1999

[54] COMMUNICATIONS SYSTEM

[75] Inventors: Simon Daniel Brueckheimer, London; Roy Harold Mauger, Middlesex, both of United Kingdom

[73] Assignee: Northern Telecom Limited, Quebec, Canada

[21] Appl. No.: 08/737,818

[22] PCT Filed: May 19, 1995

[86] PCT No.: PCT/GB95/01134

§ 371 Date: Mar. 21, 1997

§ 102(e) Date: Mar. 21, 1997

[87] PCT Pub. No.: WO95/32597

PCT Pub. Date: Nov. 30, 1995

[30] Foreign Application Priority Data

May 21, 1994 [GB] United Kingdom .................... 9410294

[51] Int. Cl.[6] .................................................. H04J 12/56
[52] U.S. Cl. ........................... 370/397; 370/466; 370/474
[58] Field of Search .................................. 370/252, 253, 370/256, 465, 466, 467, 378, 379, 352, 353, 470, 471, 395, 397, 474

[56] References Cited

U.S. PATENT DOCUMENTS

| | | | |
|---|---|---|---|
| 5,206,858 | 4/1993 | Nakano et al. | 370/465 |
| 5,301,189 | 4/1994 | Schmidt et al. | 370/356 |
| 5,341,376 | 8/1994 | Yamashita | 370/466 |
| 5,428,609 | 6/1995 | Eng et al. | 370/392 |
| 5,482,527 | 1/1996 | Doshi et al. | 370/399 |
| 5,541,926 | 7/1996 | Saito et al. | 370/474 |
| 5,742,600 | 4/1998 | Nishihara | 370/395 |
| 5,764,637 | 6/1998 | Nishihara | 370/397 |

*Primary Examiner*—Chau Nguyen
*Assistant Examiner*—Kenneth Vanderpuye
*Attorney, Agent, or Firm*—Lee, Mann, Smith, McWilliams, Sweeney & Ohlson

[57] ABSTRACT

An ATM communications system incorporates both broadband and narrowband services. A plurality of channels are adapted into groups, each group comprising a virtual circuit for transmission purposes. Each group is subsequently readapted back to individual channels. Any channel can be connected with any virtual circuit and each group of channels comprising a virtual circuit maintains time slot integrity throughout the adaptation and transmission process.

6 Claims, 9 Drawing Sheets

COMMUNICATIONS SYSTEM

This invention relates to digital communications systems and in particular to systems embodying asynchronous transfer mode (ATM) technology.

The asynchronous transfer mode (ATM) technology is a flexible form of transmission which allows any type of service traffic, voice, video or data, to be multiplexed together on to a common means of transmission. In order for this to be realised, the service traffic must first be adapted typically into 53 byte cells comprising 5 byte headers and 48 byte payloads such that the original traffic can be reconstituted at the far end of an ATM network. This form of adaptation is performed in the ATM adaptation layer (AAL). Five types of adaptation layer have been defined, this invention relates to adaptation layer 1 which is used to adapt constant bit rate traffic to the ATM standard.

A general description of a host interface for an ATM network is given in specification number WO-A-9222034 which describes a method of transmitting traffic carried in channels. A discussion of a hardware implementation of AAL and ATM protocol layers is given by G Marino et al. in Proceedings of Interworking '92, Amsterdam, 18 to 20 November 1992, pages 166 to 178. The prototyping of an ATM adaptation layer in a multimedia terminal is discussed by G Armitage et al. in International Journal of Digital and Analog Communication Systems, Vol. 6 No. 1, January 1993, pages 3 to 14.

An ATM exchange may support POTS or ISDN services as well as B-ISDN services. The H320 Video conference standard is a typical user of an n×64 Kb/s service, this may well be embedded within a B-ISDN workstation and can also be supported by the N-ISDN. In an ATM exchange with 2 Mb/s trunk circuits with independent calls on each 64 kb/s channel it is desirable that traffic once adapted to ATM should remain in ATM up to the destination narrowband port. It is further desirable that a physical trunk at e.g. 155 Mb/s should be able to carry logical routes to more than one destination as 155 Mb/s is generally too large a capacity for trunking within a narrowband service network. If the logical routes are of n×64 kb/s where n≧6 then the cell assembly delay is reduced to the point that echo cancellation is no longer necessary. The cell assembly delay of a single 64 kb/s circuit is 6 msec which requires echo cancellation for interworking with the existing narrowband network.

The object of the invention is to provide a flexible means to implement the network requirements outlined above.

According to one aspect of the present invention there is provided an asynchronous transfer mode (ATM) communications system supporting both broadband and narrowband services carried in respective channels, the system including means for adapting a plurality of channels into groups, each said group comprising a virtual channel for transmission purposes, ingress and egress frame memories, means for staticising a synchronous transport mode (STM) stream into the egress frame memory, means for distributing the content of the ingress frame memory as an STM stream, and means for readapting each said group back to individual channels, wherein the adaptation and readaptation processes are controlled by a chain structure, each link in the chain comprising two bidirectional pointers and an address in the egress or ingress frame memory, there being one link per channel in each of the egress or ingress chains, wherein a said chain is assembled for each active ATM virtual circuit, and wherein the system is such that any individual channel can be associated with any virtual channel, and that any said group of channels maintains time slot integrity throughout the adaptation and transmission process According to another aspect of the invention there is provided a method of transmitting traffic carried in channels in an asynchronous transfer mode (ATM) communications system supporting both broadband and narrowband services carried in respective channels, the method including for adapting a plurality of channels into groups, each said group comprising a virtual channel for transmission purposes, ingress and egress frame memories, staticising a synchronous transport mode (STM) stream into the egress frame memory, distributing the content of the ingress frame memory as an STM stream, and readapting each said group back to individual channels such that any individual channel can be associated with any virtual channel, and that any said group of channels maintains time slot integrity throughout the adaptation and transmission process, wherein the adaptation and readaptation processes are controlled by a chain structure, each link in the chain comprising two bidirectional pointers and an address in the egress or ingress frame memory, there being one link per channel in each of the egress or ingress chains, and wherein a said chain is assembled for each active ATM virtual circuit.

Embodiments of the invention will now be described with reference to the accompanying drawings in which.

Figure 1:
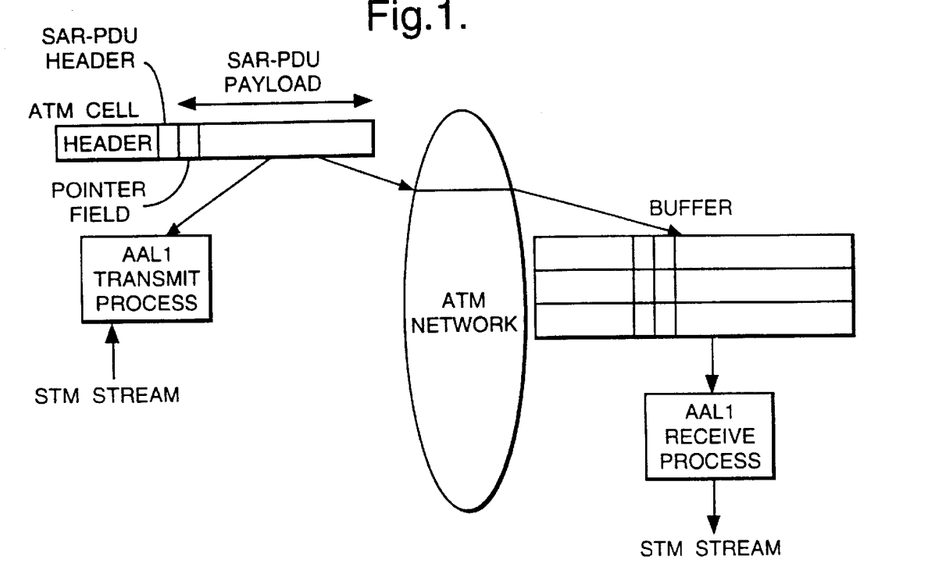
FIG. 1 illustrates the function of the ATM adaptation layer 1 (AASL1)

FIGS. 1 to 5 refer to the specification or protocol of the ATM adaptation layer 1 (AAL1) and are included here to facilitate the understanding of the invention. The generic functions performed by the AAL1 are illustrated in FIG. 1. The basic purpose of AAL1 is to segment a synchronous transmission mode (STM) signal into ATM cells which can be transported across an ATM network and reassembled into an exact replica of the STM stream at the far end. In order to achieve this, the STM stream is divided into 46 or 47 byte protocol data units (PDU) and assembled together with a segmentation and assembly (SAR)-PDU header and an optional pointer into the 48 byte payload of an ATM cell. This cell is then launched across an ATM network and is processed by an AAL1 receiver processor to recreate the STM stream. The ATM network incurs delay in transfer of the cells and this delay may be subject to variation depending on the traffic situation, cells are therefore buffered at the receive processor so that any delay variation can be eliminated.

Figure 2:
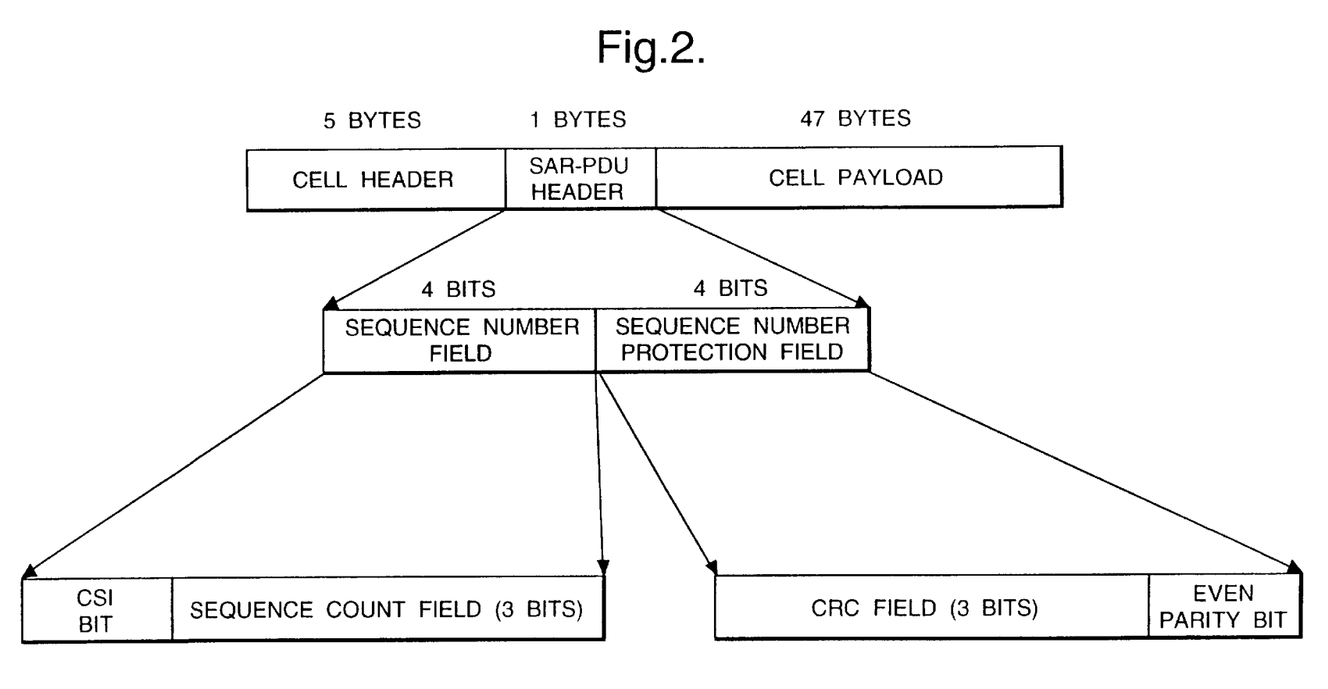
FIG. 2 shows the ATM cell construction.
Figure 3:
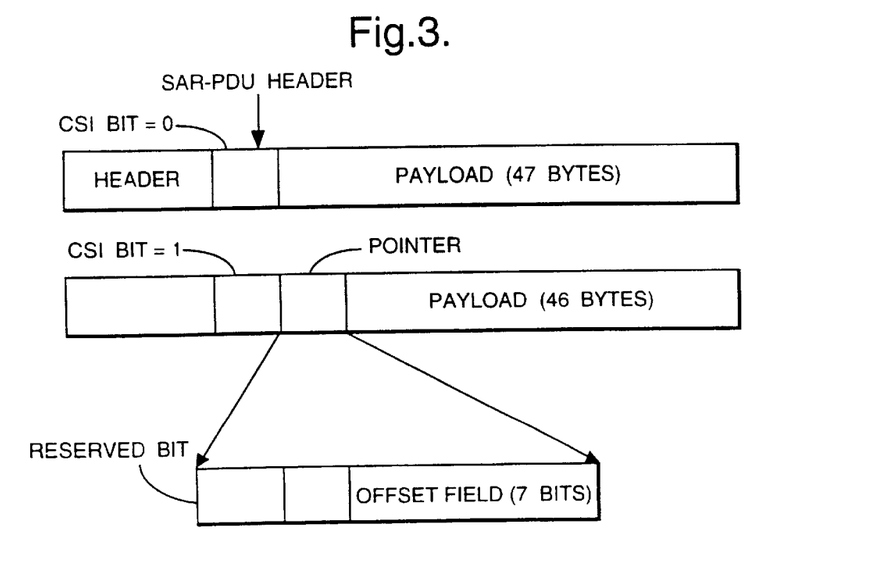
FIG. 3 illustrates the use of the ATM adaptation layer 1 for standard data transfer.

The content of the SAR-PDU header is illustrated in FIG. 2, the basic function is to provide a sequence count in order to detect lost or misdirected cells and an error check on the sequence count in order to ensure the integrity of the process of this detection. AAL1 supports two types of adaptation:

asynchronous which is used for systems with a clock which is independent of the ATM network, e.g. the 3 Mb/s G703 system and synchronous e.g. n×64 kb/s where the clock is synchronised to the ATM system clock. This invention is related to the synchronous form of transfer. In order to identify the individual channels it is necessary to indicate the starting byte of a frame of n×64 kb/s data. This is achieved by the AAL1 structured data transfer mechanism as illustrated in FIG. 3. The CSI bit within the SAR-PDU header is used to indicate whether a pointer byte is contained within the payload, if a pointer byte is present then this indicates the start of an n×64 kb/s frame anywhere within the combined 93 bytes of two PDU's.

Figure 4:
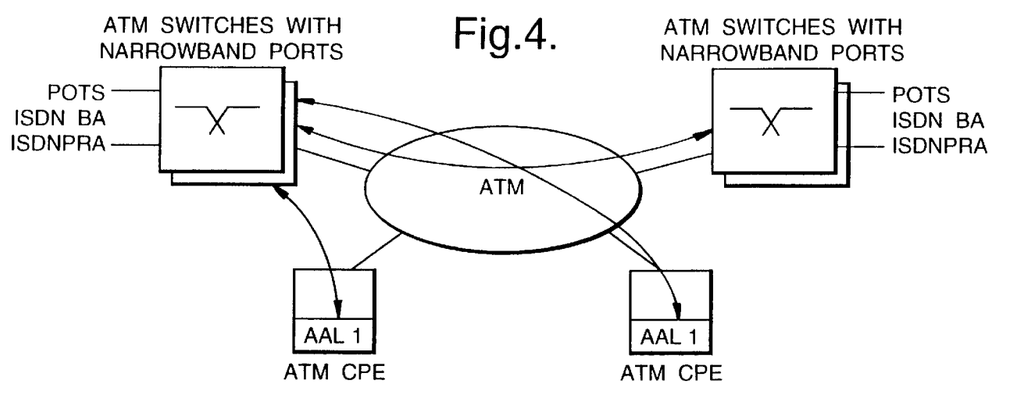
FIG. 4 illustrates the interworking of N-ISDN with B-ISDN using the AAL1.

FIG. 4 illustrates the manner in which an ATM exchange can support POTS or ISDN services as well as B-ISDN services. In FIG. 4, the arrows represent AAL1 switched channels carrying multiple cells. POTS and narrow band service interfaces are adapted by the ATM switches to carry individual calls.

Figure 5:
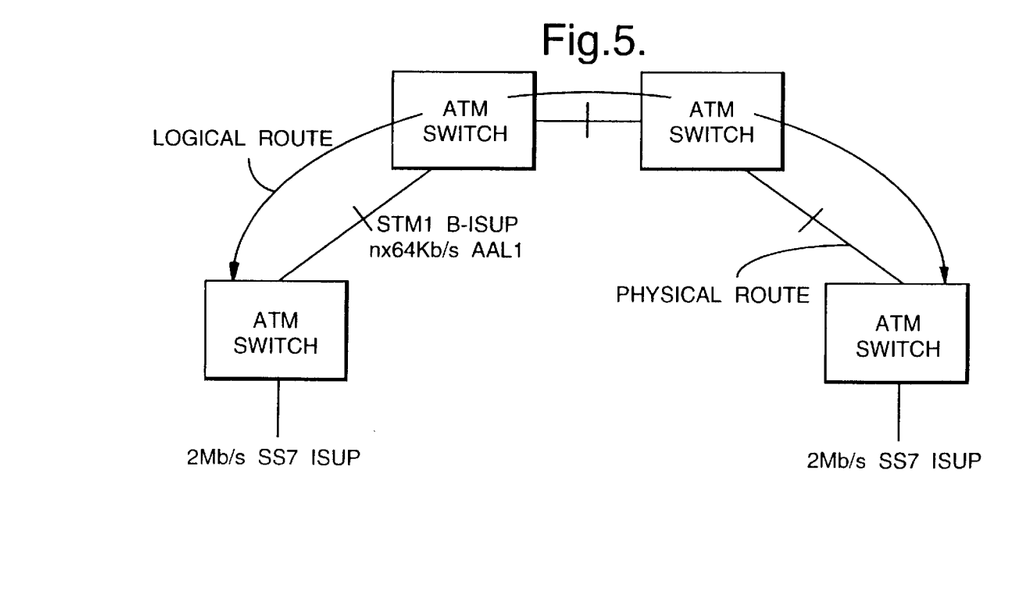
FIG. 5 shows the use of ATM switches for narrowband trunking.

FIG. 5 illustrates the manner in which traffic, once adapted to ATM, services in the ATM format up to the destination narrowband port. The AAL1 switched channel connection is carried between the two AAL1 switches at the adaptation points. The signalling for the purpose of narrow band calls may be via narrow band ISUP at the end exchanges. each call request leads to an additional 64 kb/s channel being allocated on the n×64 kb/s switched channels. Where additional switched channels are required, these are created by SVCs using the broadband ISUP signalling within the ATM network.

In a typical narrowband telecommunications system a common STM bus is available on the backplane of the equipment. This is used as the interface between the equipment which adapts external interfaces such as analogue or ISDN lines and the equipment which performs the intrinsic function such as switching. An equipment which adapts to an external STM1 system would typically have 2048 64 kb/s channels available on the backplane to the adaptation function. The purpose of the present invention is to allow the adaptation of a number of 64 kb/s channels, say 2048, into a number of n×64 kb/s ATM virtual circuits and the re-adaptation to 64 kb/s channels within the following constraints:-

Any 64 kb/s channel can be associated with any ATM virtual circuit

Any group of P 64 kb/s channels can be assembled together as part or whole of an ATM virtual circuit and will maintain time slot sequence integrity throughout the adaptation and transmission processes.

For conformance to AAL1 standards n is restricted to values from 1 to 30. For proprietary applications n can have any integer value up to the full capacity of the system.

The number of ATM virtual circuits M can be any value up to the limit of 1 64 Kb/s circuit per ATM VC i.e. $1 \leq M \leq 2048$ for this example.

Figure 6:
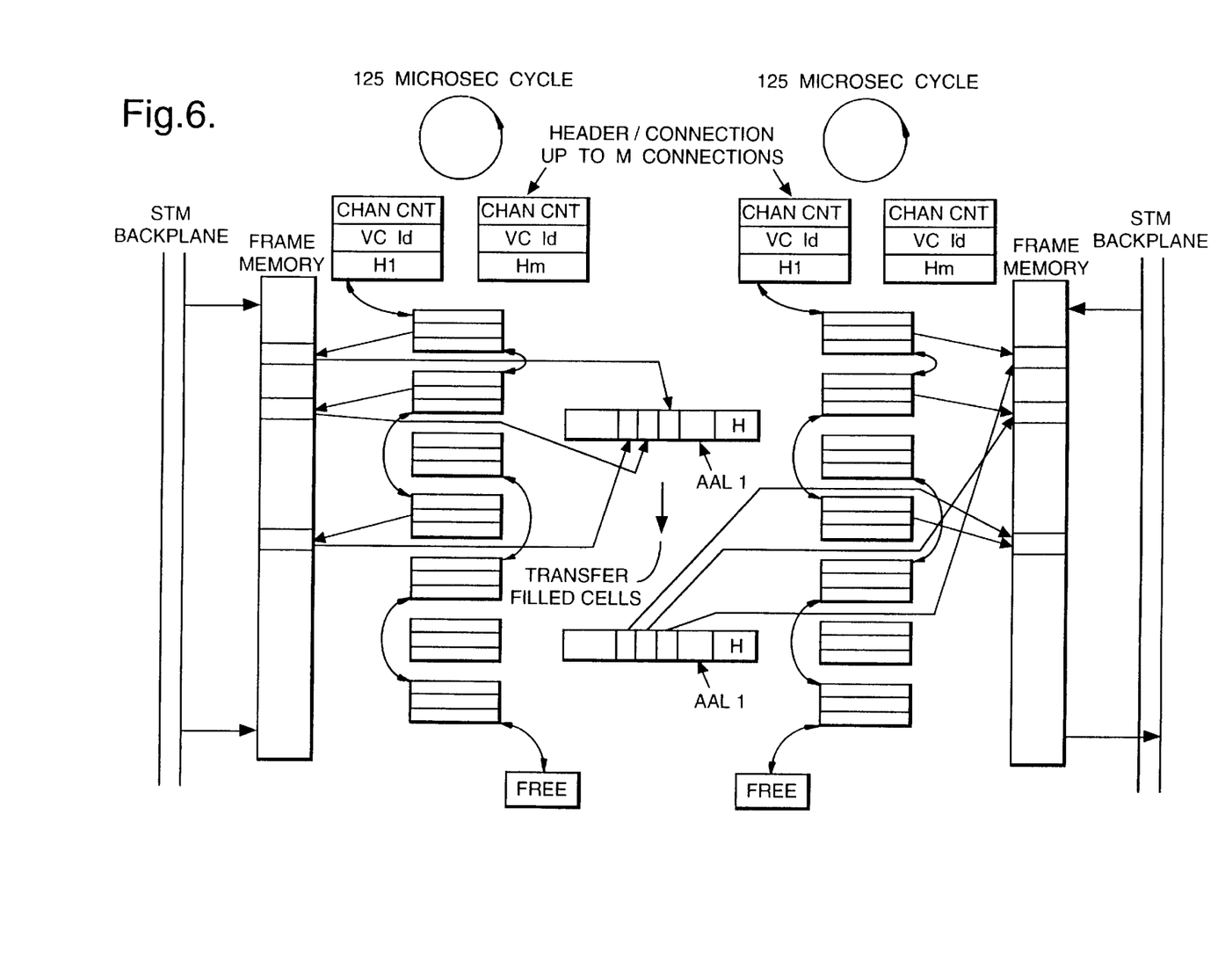
FIG. 6 shows in schematic form a flexible AAL1 mechanism according to one embodiment of the invention.
Figure 7:
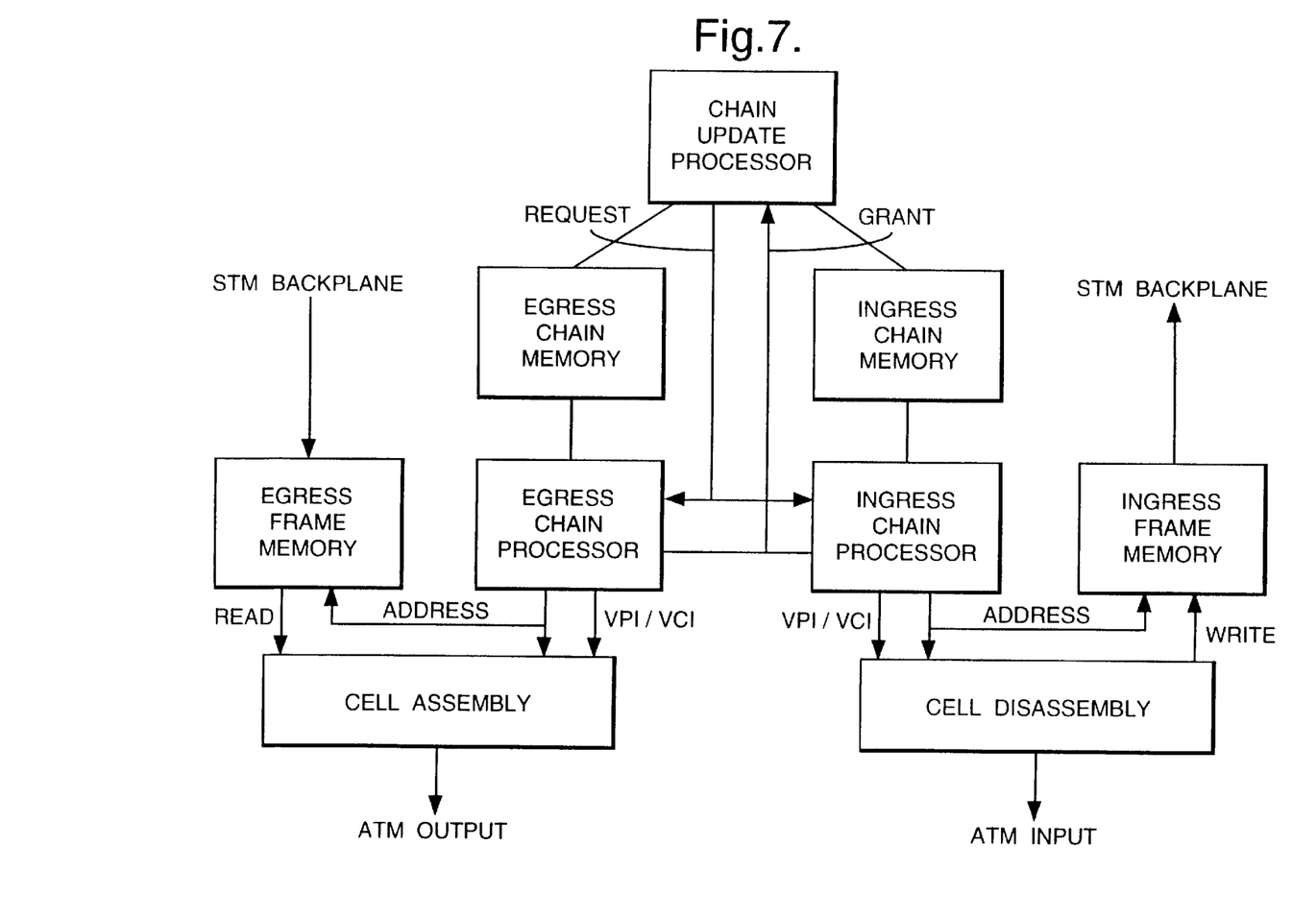
FIG. 7 is a functional block diagram of the flexible AAL1 mechanism of FIG. 6.

The principle of one embodiment of the mechanism is illustrated in FIG. 6 and the functional block diagram of its implementation is illustrated in FIG. 7. In both diagrams a process is implied, but not shown, which runs e.g. at 125 microsecond intervals and staticises the STM stream on the backplane into an Egress frame memory and takes the contents of an ingress frame memory and distributes this as an STM stream to the backplane. The mechanism is controlled by a chain structure, each link in the chain is embodied as a combination of two bi-directional pointers and an address in the egress or ingress frame memory, there is one link for each 64 kb/s channel in each of the egress and ingress chains. Chains are linked to headers and there is one header for each potential n×64 Kb/s ATM virtual circuit, headers are embodied by the association of a channel count for control purposes, a VC identity for cell assembly purposes and a bidirectional pointer to the first link of the chain. A chain is assembled for each active ATM virtual circuit, it consists of a number of links which use bi-directional pointers to point upwards to the header or previous link and downwards to the next link. Each link contains the address in the frame memory of the required frame sample, these being taken in order to assemble an ATM cell one byte at a time for the VC.

When a cell is filled it is dispatched. The reverse process unpacks a cell one byte at a time and the memory address within the link is used to store the unpacked byte in the Ingress frame memory.

Figure 8:
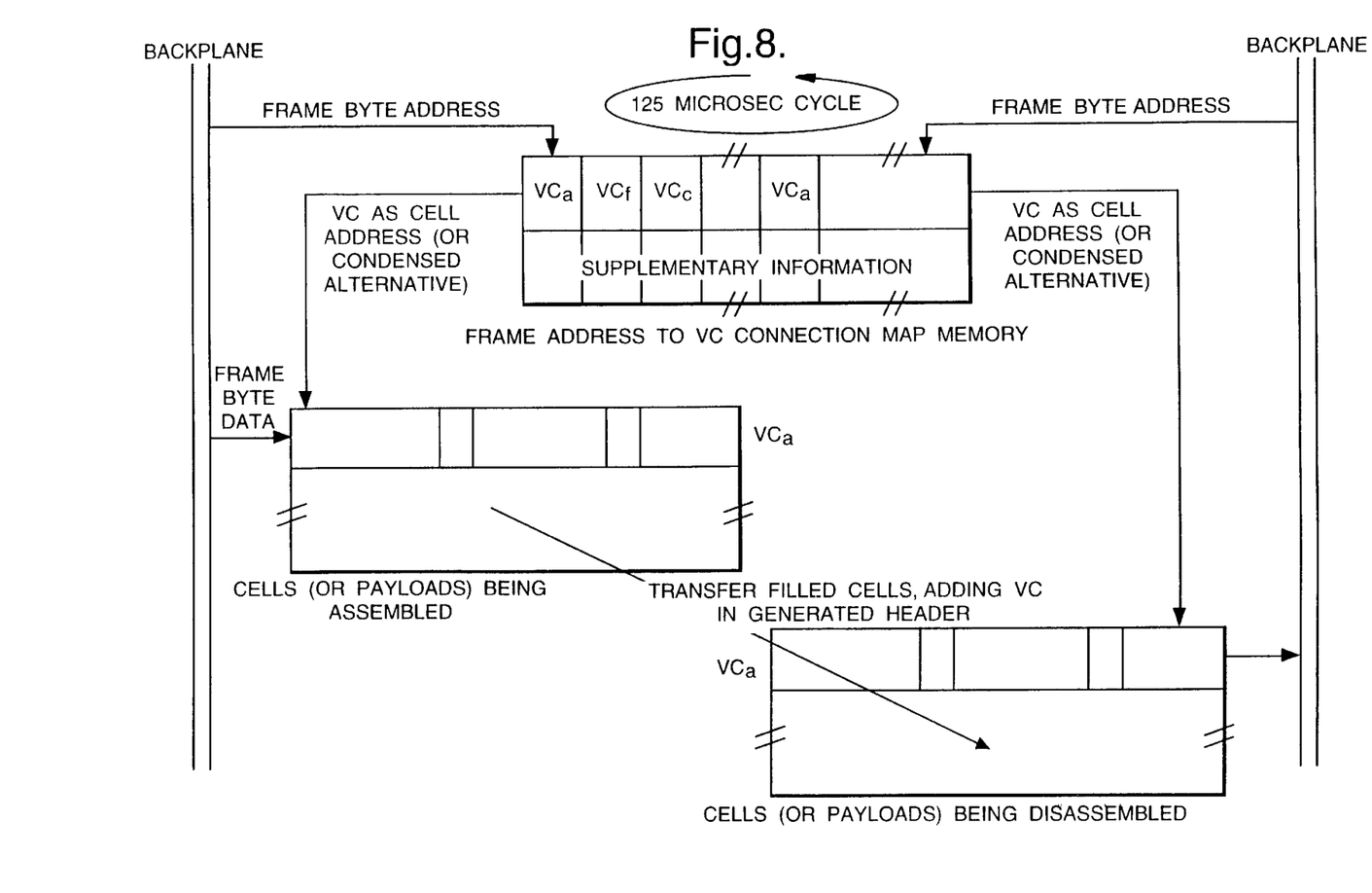
FIG. 8 shows an alternative flexible AAL1 mechanism.
Figure 9:
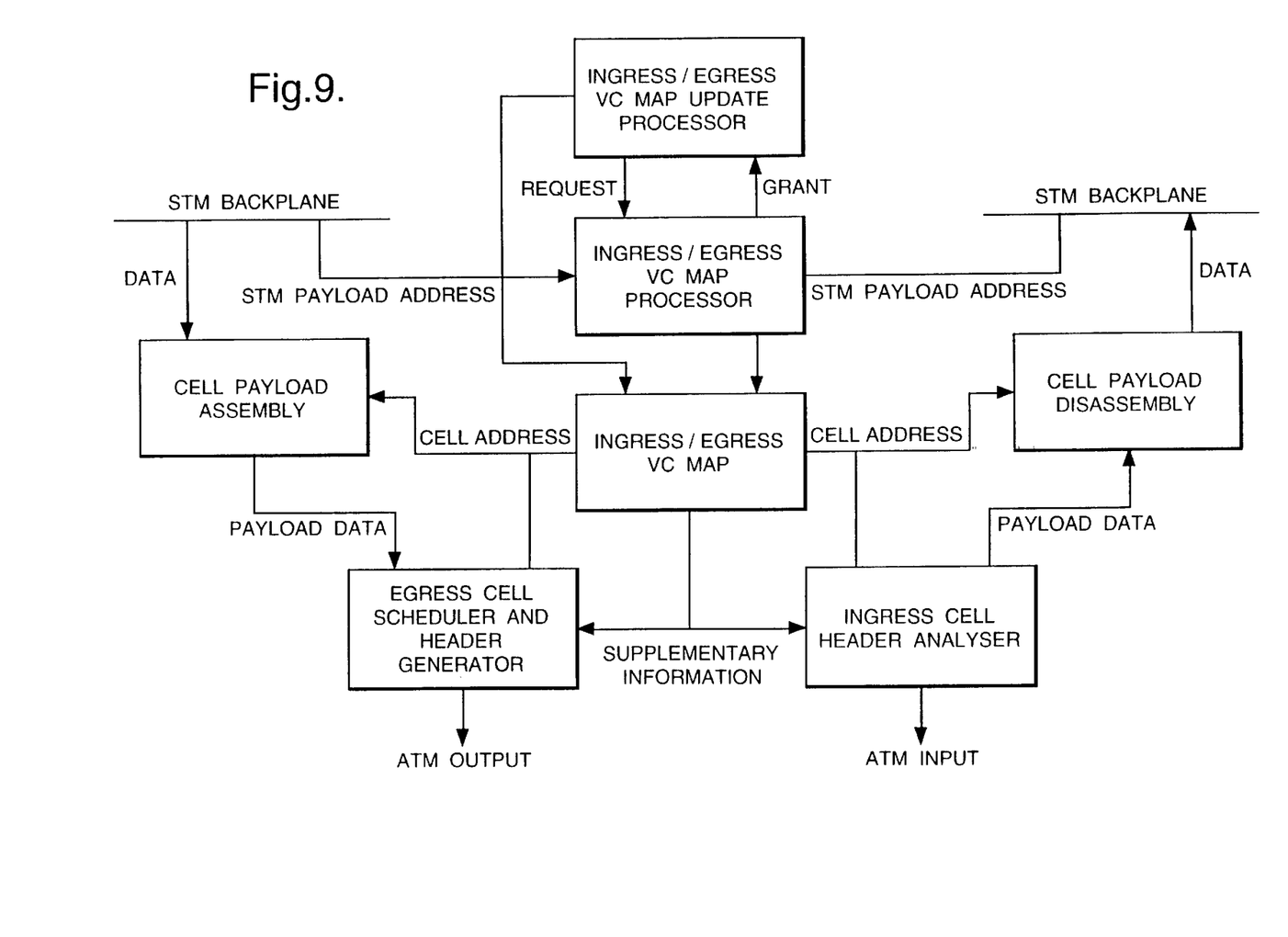
FIG. 9 is a functional block diagram of the mechanism of FIG. 8.
Figure 10:
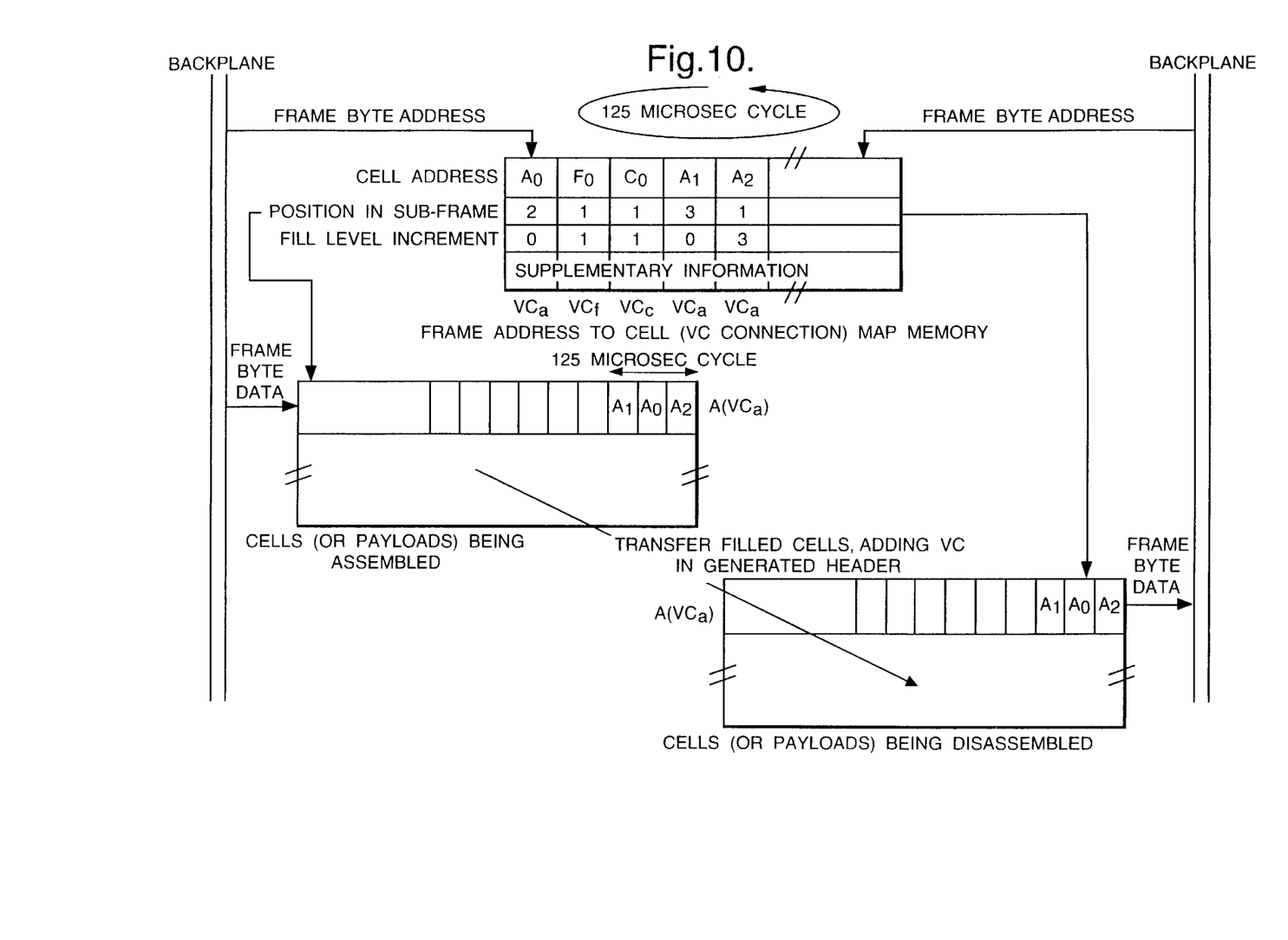
FIG. 10 illustrates the time slot integrity of the arrangement of FIG. 8.
Figure 11:
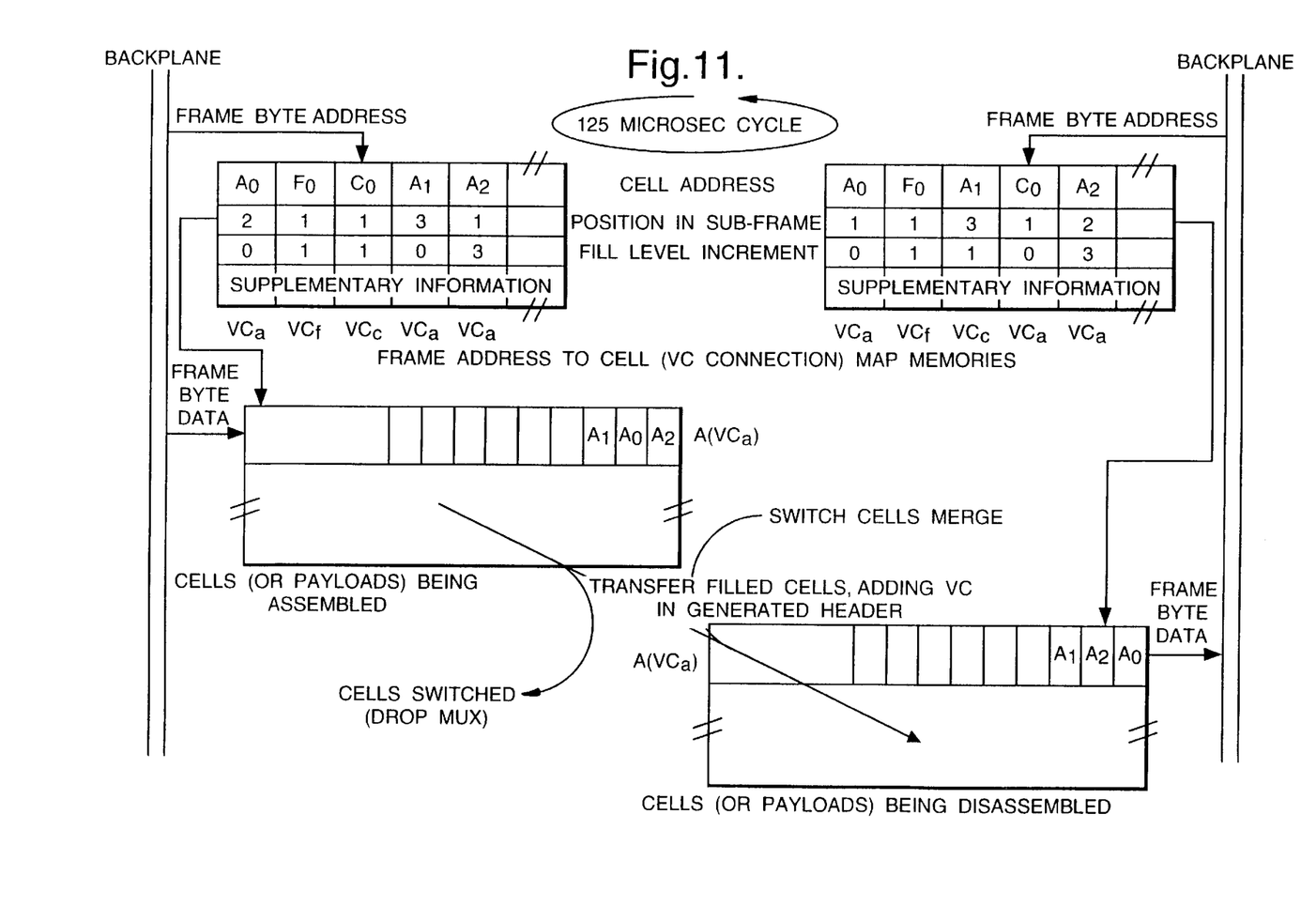
FIG. 11 illustrates the time slot interchange protocol of the arrangement of FIG. 8.

An alternative embodiment is illustrated in FIGS. 8 to 11 of the accompanying drawings. The principle of the mechanism is shown in FIG. 8, and the functional block diagram of its implementation is shown in FIG. 9. The time slot integrity and the time slot interchange are shown in FIGS. 10 and 11 respectively. In FIGS. 8 to 11 a process is implied, but not shown, which cycles every 125 microseconds, and generates the address on the backplane, and supplies or accepts the relevant data across the backplane. The mechanism is controlled by the backplane address, which is used either directly on indirectly to access the Address to Connection Map Memory, which addresses at any one time, and once only, each valid address in the entire address range of the frame in each 125 microsecond cycle, which address may be each valid address in an arbitrary order. Ordinarily there is a location in the memory for each backplane address or each 64 Kb/s channel. As an optional, the ingress and egress backplane cycles may be synchronised such that the address on each backplane is the same at any given instant, they may share the same address port of the map.

For the egress process the map contains either directly or indirectly all the information necessary for assembling the frame byte data or 64 Kb/s channel data into the payload of the corresponding ATM virtual circuit, and the information for the construction of the header of the cells of the corresponding ATM Virtual Circuit, for which process the backplane address is used to retrieve from the map the address in the cell payload memory of the ATM virtual circuit to which the 64 Kb/s channel corresponds, and retrieves any form of supplementary information from the same map for the purposes of cell assembly or disassembly, which supplementary information may comprise for the purposes of example the VCI/VPI of the ATM circuit, and which may also comprise the overall length of the cell payload for each payload of the same ATM Virtual Circuit, such length may optionally be different from any conventional length of ATM cell payloads, and such length may be different from other simultaneous ATM virtual circuits cell payloads, and which may also optionally comprise an offset in the ATM cell payload and which may also comprise all manner of information and attribution per 64 Kb/s channel byte and per ATM Virtual Circuit, the cell address being used to derive the next available byte position in the corresponding cell payload, which payload when filled to the conventional length or a length determined as earlier is scheduled for dispatch by a scheduling process, which scheduling process assembles the payloads with their ATM Header and AAL1 SAR-PDU Header using the cell address and supplementary information either directly or indirectly from the map, which assembled cells are launched into the ATM, whereafter a new cell payload is begun for the corresponding ATM Virtual Circuit. For the egress process the Frame address changes for each byte of frame data, which frame address is used to retrieve the cell address from the map, which map may have assigned the same cell address to more than one 64 Kb/s channel in the same frame an arbitrary number of times. This method is used to assemble cell payloads for n×64 Kb/s channels for arbitrary n and for an arbitrary m ATM Virtual Circuits per 125 microsecond cycle, which cell address may also be used to signify an unassigned channel which data is not used for cell assembly purposes. Those skilled in the art will appreciate that the aforementioned scheduling process may dispatch assembled ATM cells with equal priority to each ATM Virtual Circuit, or may favour certain virtual circuits by means of a prearranged priority, which priority may be provided for by means of the supplementary information of the map.

For the ingress process in the same or other receiving equipment, the ATM Virtual Circuit is determined by a header analysing process that relates the virtual circuit to a cell address by direct or indirect means of the supplementary information of the aforementioned map or by other means, which relationship between virtual circuit and cell address may be identical to or independent of the egress process, which header analyser removes the ATM Header and the AAL1 SAR-PDU Header and stores the cell payload in a memory at the cell address, which cell payload memory is accessed by an ingress VC map process that determines the next available byte in a cell payload to be put on the backplane as the Frame byte data from the Frame byte address, which address is used directly or indirectly to retrieve the cell address from the aforementioned or equivalent map, which process is the reverse of the egress process, which process may also check and process any error in the indication in the AAL1 of the boundary of an n×64 Kb/s channel and the Frame.

An Ingress/Egress VC map update process operates under instructions from the System Control, which process operates a Request/Grant mechanism with the Ingress/Egress VC Map process to ensure that the map is not modified at the same time as it is being accessed, which process could update the entire map in a single 125 microsecond cycle either ahead or behind the Ingress/Egress VC Map process. The modifications may take effect in the same or next Frame cycle without any interruption or delay in processing the frame or ATM data. This process may straightforwardly and arbitrarily change n for any and all ATM Virtual Circuits by changing the cell address and supplementary information in any location in the map without affecting any other location or the service provided.

The aforementioned mechanism optionally provides the direct ability to reserve n×64 Kb/s channels on a Virtual Circuit of which n, x≦n may represent 64 Kb/s channels in use, and where x may vary in time when channels fall into disuse or more of the n channels are utilised. This variation may be arranged not to affect any other channel in the same Virtual Circuit by means of an offset in the supplementary information of the aforementioned map. In the egress process the operation is as described wherein the backplane address is used to retrieve from the map the address in the cell payload memory of the ATM virtual circuit to which the 64 Kb/s channel corresponds, and the offset of the 64 Kb/s channel data in a sub-frame in the payload of the cell. The sub-frame is of length n in bytes, where n is not necessarily a factor of the payload length of the cell, which offset is less than n and greater than zero. The offset is different for each 64 Kb/s channel in the 125 microsecond frame which corresponds to the same ATM Virtual Circuit, and retrieves any form of aforementioned supplementary information from the same map for the purposes of cell assembly or disassembly. The cell address and the offset are used to derive the next available byte position in the corresponding cell payload. The offset enables the 64 Kb/s channel data to be assembled into the cell payload in an order that may differ from the time sequence order in an arbitrary manner, which payload when filled to the conventional length or a length determined as earlier is scheduled for dispatch by a scheduling process as described above.

For the ingress process, the mechanism is as described for the conventional operation, wherein the ATM Virtual Circuit is determined by a header analysing process that relates the virtual circuit to a cell address. The header analyser removes the ATM Header and the AAL1 SAR-PDU Header and stores the cell payload in a memory at the cell address. The cell payload memory is accessed by an ingress VC map process that determines the next available byte in a cell payload to be put on the backplane as the Frame byte data from the Frame byte address, which address is used directly or indirectly to retrieve the cell address and the offset from the aforementioned or equivalent map. The cell address and offset determine the next byte of the cell payload. The process, which is the reverse of the egress process, may also check and process any error in the indication in the AAL1 of the boundary of an n×64 Kb/s channel and the Frame.

Those skilled in the art will appreciate that the offsets in the ingress and egress map may differ, and the Virtual Circuits of a time slot or 64 Kb/s channel may differ, to the extent that the aforementioned mechanism directly provides the ability to perform time slot interchange without any loss of generality between ingress and egress backplanes.

We claim:

1. An asynchronous transfer mode (ATM) communications system supporting both broadband and narrowband services carried in respective channels, the system including means for adapting a plurality of channels into groups, each said group comprising a virtual channel for transmission purposes, ingress and egress frame memories, means for storing a synchronous transport mode (STM) stream into the egress frame memory, means for distributing the content of the ingress frame memory as an STM stream, and means for readapting each said group of channels back to individual channels, wherein the adaptation and re-adaptation processes are controlled by a chain structure of control data, there being one link per channel in each of the egress or ingress chains, wherein a said chain is assembled for each active ATM virtual circuit, each link in the chain comprising two bidirectional pointers to the previous and successive links respectively and incorporating a respective address in the egress or ingress frame memory for effecting said storing and redistribution in an ordered manner whereby any said group of channels maintains time slot integrity throughout the adaptation and transmission process.

2. A communications system as claimed in claim 1, and including means for mapping into each assembled cell or payload the information necessary for the frame byte data or channel data and the information from the construction of the header of the cells of the corresponding ATM virtual circuit.

3. A communications system as claimed in claim 2, wherein the readaptation process includes mapping of a said virtual circuit to a corresponding cell address.

4. A method of transmitting traffic carried in channels in an asynchronous transfer mode (ATM) communications system supporting both broadband and narrowband services carried in respective channels, the method including for adapting a plurality of channels into groups, each said group comprising a virtual channel for transmission purposes, ingress and egress frame memories, storing a synchronous transport mode (STM) stream into the egress frame memory, distributing the content of the ingress frame memory as an STM stream, and readapting each said group of channels back to individual channels such that any individual channel can be associated with any virtual channel, wherein the adaptation and re-adaptation processes are controlled by a chain structure of control data, there being one link per channel in each of the egress or ingress chains, wherein a said chain is assembled for each active ATM virtual circuit, each link in the chain comprising two bidirectional pointers to the previous and successive links respectively and incorporating a respective address in the egress or ingress frame memory for effecting said storing and redistribution in an ordered manner whereby any said group of channels maintains time slot integrity throughout the adaptation and transmission process.

5. A method as claimed in claim 4, and including mapping into each assembled cell or payload the information necessary for the frame byte data or channel data and the information from the construction of the header of the cells of the corresponding ATM virtual circuit.

6. A method as claimed in claim 5, wherein the readaptation process includes mapping of a said virtual circuit to a corresponding cell address.

* * * * *